US012803439B2

(12) United States Patent
Xiao et al.

(10) Patent No.: US 12,803,439 B2
(45) Date of Patent: Nov. 17, 2026

(54) REVERSE RECOVERY CURRENT REDUCTION IN DC-DC CONVERTERS

(71) Applicant: TEXAS INSTRUMENTS INCORPORATED, Dallas, TX (US)

(72) Inventors: Zhekai Xiao, Shanghai (CN); Jian Liang, Shanghai (CN); Minhua Zhang, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 140 days.

(21) Appl. No.: 18/630,391

(22) Filed: Apr. 9, 2024

(65) Prior Publication Data

US 2025/0317061 A1 Oct. 9, 2025

(51) Int. Cl.

| | |
|---|---|
| *H02M 3/158* | (2006.01) |
| *G05F 1/56* | (2006.01) |
| *H02M 1/00* | (2006.01) |
| *H02M 1/08* | (2006.01) |
| *H02M 3/157* | (2006.01) |

(52) U.S. Cl.

CPC ......... *H02M 3/158* (2013.01); *H02M 1/0051* (2021.05); *H02M 1/08* (2013.01); *G05F 1/56* (2013.01); *H02M 3/157* (2013.01); *H02M 3/1582* (2013.01)

(58) Field of Classification Search

CPC ........ H02M 1/08; H02M 3/157; H02M 3/158; H02M 3/1582; G05F 1/56

See application file for complete search history.

(56) References Cited

U.S. PATENT DOCUMENTS

| | | | | |
|---|---|---|---|---|
| 7,541,861 | B1 * | 6/2009 | Aslan | G05F 3/26 327/543 |
| 10,855,183 | B1 * | 12/2020 | Barrenscheen | H02M 3/33592 |
| 2019/0058394 | A1 * | 2/2019 | Neidorff | H02M 1/08 |
| 2020/0007088 | A1 * | 1/2020 | Ranta | H03F 1/22 |
| 2021/0296986 | A1 * | 9/2021 | Wu | H02M 3/158 |

* cited by examiner

*Primary Examiner* — Gary A Nash

(74) *Attorney, Agent, or Firm* — Charles F. Koch

(57) ABSTRACT

In some examples, a circuit includes a first transistor having first and second terminals; a first current source having first and second terminals, the first terminal of the first current source coupled to the first terminal of the first transistor, and the second terminal of the first current source coupled to the second terminal of the first transistor; a second transistor having a control terminal and first and second terminals, the control terminal of the second transistor coupled to the second terminal of the first current source, and the first terminal of the second transistor coupled to the second terminal of the first current source; a third transistor having first and second terminals, the first terminal of the third transistor coupled to the second terminal of the second transistor; and a fourth transistor having first and second terminals, the first terminal of the fourth transistor coupled to the second terminal of the first current source, and the second terminal of the fourth transistor coupled to the second terminal of the third transistor.

24 Claims, 9 Drawing Sheets

REVERSE RECOVERY CURRENT REDUCTION IN DC-DC CONVERTERS

BACKGROUND

A switched mode power supply (SMPS), which may be referred to as a power converter or a direct-current (DC)-to-DC converter, transfers power from an input power source to a load by switching one or more power transistors or other switching elements coupled through a switch node/terminal to an energy storage element (such as an inductor, an inductance of a transformer, and/or a capacitor), which is capable of coupling to the load. If the input voltage is greater than the output voltage, the power converter may be referred to as a "step-down" converter/regulator or a "buck converter." If the input voltage is less than the output voltage, the power converter may be referred to as a "step-up" converter/regulator or a "boost converter." Other power converter types can include a buck-boost power converter combining both step-down and step-up functionality. The power transistors can be included in a power converter that includes, or is capable of coupling to, the energy storage element. A SMPS can include a SMPS controller to provide one or more gate drive signals to the power transistor(s).

SUMMARY

In some examples, a circuit includes a first transistor having first and second terminals. The circuit also includes a first current source having first and second terminals, the first terminal of the first current source coupled to the first terminal of the first transistor, and the second terminal of the first current source coupled to the second terminal of the first transistor. The circuit also includes a second transistor having a control terminal and first and second terminals, the control terminal of the second transistor coupled to the second terminal of the first current source, and the first terminal of the second transistor coupled to the second terminal of the first current source. The circuit also includes a third transistor having first and second terminals, the first terminal of the third transistor coupled to the second terminal of the second transistor. The circuit also includes a fourth transistor having first and second terminals, the first terminal of the fourth transistor coupled to the second terminal of the first current source, and the second terminal of the fourth transistor coupled to the second terminal of the third transistor.

In some examples, a circuit includes a power converter, a controller, and a high-side driver circuit coupled to the controller. The power converter includes first and second high-side transistors arranged to form a high-side switch device coupled between a switch node and an output terminal of the power converter. The controller is configured to provide first, second, and third control signals. The high-side driver circuit is configured to provide gate control signals having first voltages based on the first control signal having a first value to cause the first and second high-side transistors to be conductive in a forward direction at a first time at a first conductive state. The high-side driver circuit is also configured to provide gate control signals having second voltages based on the first control signal having a second value and second and third control signals to have the second value. The high-side driver circuit is also configured to, responsive to the second and third control signals, provide, by the high-side driver circuit, the gate control signals having second voltages at the gate terminals of the first and second high-side transistors to cause the first and second high-side transistors to be conductive in the forward direction at a second time at a second conductive state, wherein the second conductive state is less conductive than the first conductive state.

DETAILED DESCRIPTION

Figure 1:
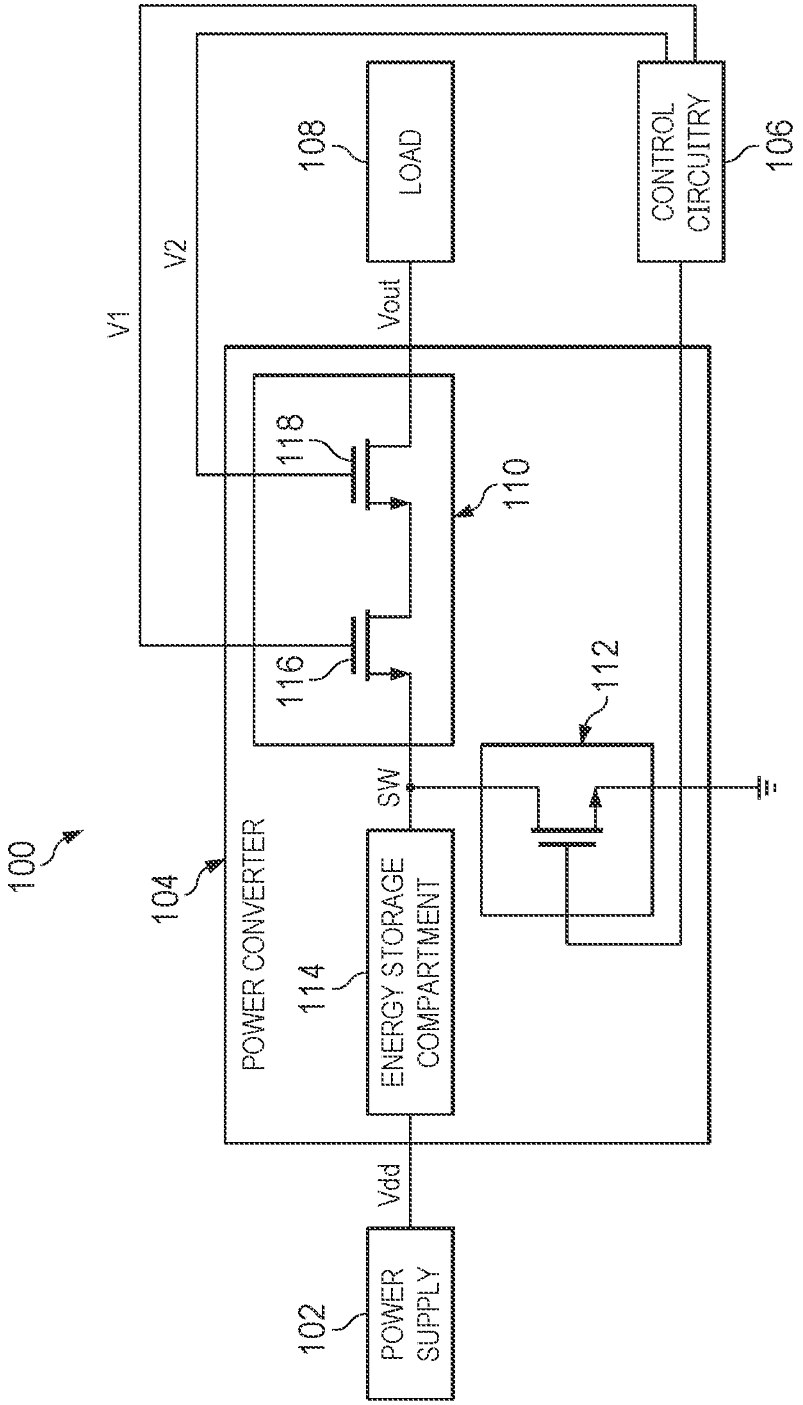
FIG. 1 is a block diagram of an example system, in accordance with various examples.

As described above, a power converter receives an input voltage (Vdd) having a first value and provides an output voltage (Vout) having a second value that is less than, greater than, or approximately equal to, the first value. To control a mode of operation of the power converter, a controller provides gate control signals to one or more power transistors of the power converter. The gate control signals received by a power transistor control whether the power transistor is in a conductive state (e.g., turned on) or in a non-conductive state (e.g., turned off). Each state of a power converter involves a specific combination of transistors that are in conducting states and transistors that are in non-conducting states. To change a mode of operation of the power converter, the controller modifies the sequence of switching states that it commands the transistors to assume. In at least some examples, the controller implements a state machine or other logic such that values of the gate control signals are determined based on a mode of operation of, or for, the power converter.

In some circumstances, a first power transistor of a power converter, such as a high-side power transistor, is controlled to transition from a conducive state to a non-conductive state prior to controlling a second power transistor of the power converter, such as a low-side power transistor, to transition the low-side power transistor from a non-conducive state to a conductive state. The time between controlling the first power transistor to become non-conductive and controlling the second power transistor to become conductive may be referred to as dead-time. During the dead-time, current flowing from the energy storage element of the power converter may flow through a body diode of the first transistor. The body diode may be an inherently occurring component existing between first and second terminals of the first transistor (such as between a source and a drain of the first transistor), or may be a discrete component coupled between the first and second terminals of the first transistor. Responsive to controlling the second power transistor to become conductive, the body diode of the first transistor may exhibit reverse recovery characteristics. Reverse recovery of a diode refers to the situation in which a diode is initially driven in forward bias, and when the polarity suddenly switches to reverse bias, the diode will still remain conducting for some time. The time required for conduction to settle into the reverse bias state is the diode's reverse recovery time. A slope of the reverse recovery current (di/dt) at a time the second power transistor is controlled to become conductive may be comparatively large. The large di/dt may cause voltage ringing at a switch node of the power converter, an output of the power converter, and/or other nodes of the power converter, such as resulting from parasitic inductances in the power converter. This ringing may cause a drain-to-source voltage (Vds) of the first transistor to exceed a breakdown voltage or a safe operating range of the first transistor, potentially damaging, degrading performance of, or destroying the first transistor. Damage may also occur to other components coupled to the power converter.

Examples of this description provide for reduction of reverse recovery current in a power converter (e.g., a DC-DC converter). The reverse recovery current may be, for example, a reverse recovery current flowing through a high-side power transistor of the power converter. In some examples, the high-side power transistor may be implemented as a stacked device, including multiple separate power transistors coupled in series that collectively operate as the high-side power transistor. In an example, a driver receives a control signal for controlling the high-side power transistor and provides a gate control signal to the high-side power transistor based on the received control signal. The gate control signal causes the high-side power transistor to be in a conductive, or non-conductive, state. In some examples, to prevent current from flowing through the body diode of the high-side power transistor, or to reduce an amount of current flowing through the body diode of the high-side power transistor, the driver circuit may maintain the high-side power converter in a low-conductivity state. For example, a gate-to-source voltage (Vgs) of the high-side power transistor may be discharged to an intermediate voltage (Vint) that is less than a threshold voltage (Vth) of the high-side power transistor, but also large enough to cause a majority of current to flow through a channel of the high-side power transistor rather than the body diode of the high-side power transistor. In this way, the driver circuit controls the high-side power transistor to mitigate the formation of a shoot-through path from a Vout terminal of the power converter to a switch node of the power converter, while also mitigating or reducing reverse recovery currents in the power converter resulting from current flowing through the body diode of the high-side power transistor during the dead time.

FIG. 1 is a block diagram of a system 100, in accordance with various examples. The system 100 is representative of an application in which power is provided to a load. For example, the system 100 is representative of an automobile or other vehicle, a computing device such as a laptop, a notebook, a server, a smartphone, a tablet, a wearable device, or the like, a SMPS or other power supply, etc. In an example, the system 100 includes a power supply 102, a power converter 104, control circuitry 106, and a load 108, coupled as shown in FIG. 1. In an example, the control circuitry 106 includes a controller (not shown), a driver, such as a gate driver (not shown), a feedback circuit (not shown), and/or any other suitable components that may be useful in, or for, controlling the power converter 104. In some examples, at least some components of the power converter 104 and the control circuitry 106 are included on a same semiconductor die, in a same electronic component package, or the like. In other examples, at least some components of the power converter 104 and/or the control circuitry 106 are implemented on separate semiconductor dies and/or in separate electronic component packages than other components of the power converter 104 and/or the control circuitry 106.

In an example of operation of the system 100, the power converter 104 receives Vdd from the power supply 102 and provides a voltage Vout based on Vdd and control exerted by the control circuitry 106. In some implementations, the power converter 104 is a boost power converter such that Vout is greater than Vdd. In other examples, the power converter 104 is a buck power converter, a buck-boost power converter, or has any other suitable architecture. Vout is provided, for example, to the load 108, such as to power components (not shown) of the load 108 and/or facilitate other operation of the load 108. In an example, the control circuitry 106 controls the power converter 104 according to PFM. For example, the control circuitry 106 provides gate control signals to turn switches of the power converter 104 on or off. The gate control signals may be timed such that a switch of the power converter 104 is on (e.g., in a conductive state) for an amount of time determined based on a programmed value for Vout. For example, for a greater value of Vout with respect to Vdd the gate control signals may cause the switch of the power converter 104 to be on for a longer period of time than for a lesser value of Vout with respect to Vdd. The control circuitry 106 may exert control over the power converter 104 according to any suitable control scheme, the scope of which is not limited herein.

In some examples, the power converter 104 includes a high-side switch device 110, a low-side switch device 112, and an energy storage component 114. In some examples, at least some components of the power converter 104 are located on a semiconductor die or in an electronic component package different from other at least some other components of the power converter 104. For example, the low-side switch device 112 and/or the energy storage component 114 may be "off-die" components. In some examples, the high-side switch device 110 include multiple components. For example, the high-side switch device 110 may be implemented according to a stacked arrangement in which two or more switch devices, such as transistors 116, 118, are coupled in series to collectively provide the functionality of the high-side switch device 110. In some examples, the control circuitry 106 controls each of the transistors 116, 118 independently. For example, the control circuitry 106 may provide a control signal to the transistor 118 at a first time, and may provide a control signal to the transistor 116 at a second time. In this way, the control circuitry 106 controls the transistor 118 to change operational states or conditions prior to controlling the transistor 116 to change operational states or conditions. In some examples, the control circuitry 106 applies a voltage bias, or offset, to the control signals provided to the transistors 116, 118. For example, the control circuitry 106 may apply a first bias having a value of V1 to the control signal provided to the transistor 116, and apply a second bias having a value of V2 to the control signal provided to the transistor 118. The first bias and the second bias may cause the transistor 116 and the transistor 118, respectively, to operate in the low-conductivity state, described above. In this way, the control circuitry 106 may control the transistors 116, 118 to mitigate the formation of a shoot-through path through the high-side switch device 110, as well as reducing an amount of current flowing through body diodes of the transistors 116, 118. Reducing the amount of current flowing through body diodes of the transistors 116, 118 may reduce reverse recovery current flowing in the power converter 104, and particularly in the high-side switch device 110, mitigating risks of a Vds of the transistor 116, 118 exceed a breakdown voltage or a safe operating range of the transistor 116, 118, respectively, potentially damaging, degrading performance of, or destroying the transistor 116, 118 or damaging other components of the system 100.

Figure 2:
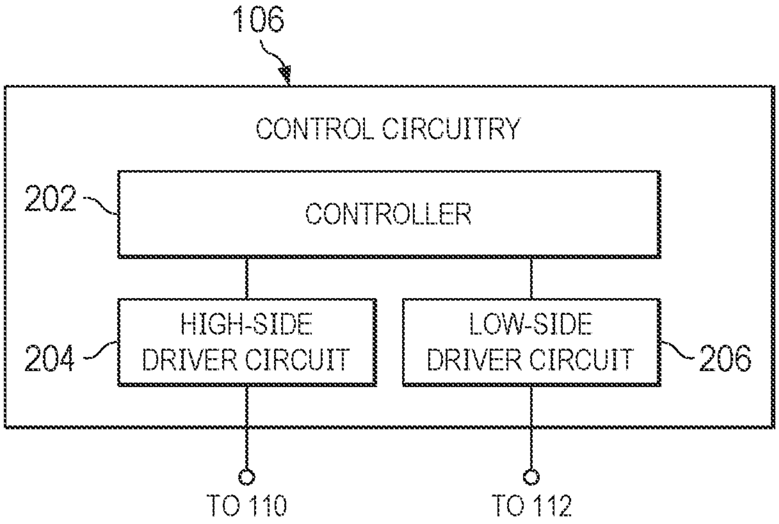
FIG. 2 is a block diagram of the control circuitry, in accordance with various examples.

FIG. 2 is a block diagram of the control circuitry 106, in accordance with various examples. While shown as a component of the system 100, in various examples the control circuitry 106 may be suitable for implementation in other systems or devices to provide control signals to switching devices, the scope of which is not limited herein. In an example, the control circuitry 106 includes a controller 202, a high-side driver circuit 204, and a low-side driver circuit 206, coupled as shown in FIG. 2. In some examples, the control circuitry 106 may also include a feedback circuit (not shown) to provide feedback based on operation of the power converter 104 and which may be useful in controlling the power converter 104, while in other examples the feedback circuit may be incorporated into the controller 202.

In an example of operation of the control circuitry 106, the controller 202 provides control signals to the high-side driver circuit 204 and the low-side driver circuit 206 to cause the high-side driver circuit 204 and the low-side driver circuit 206, respectively, to provide gate control signals to the power converter 104. In some examples, the controller 202 determines values for the control signals based on current operational conditions of the power converter 104, such as a value of Vdd, a value of Vout, a control or switching scheme of the controller 202 for the power converter 104, a mode of operation of the power converter 104 (e.g., boost, buck, buck-boost), or any other suitable criteria, the scope of which is not limited herein. In an example, the controller 202 provides a low-side control signal to the low-side driver circuit 206 to cause the low-side driver circuit 206 to provide a low-side gate control signal (LSD_GT) to the low-side switch device 112. The low-side gate control signal causes the low-side switch device 112 to be in a conductive state responsive to the low-side gate control signal having an asserted value (e.g., a logic-level high value), where the asserted value of the low-side gate control signal causes a Vgs of the low-side switch device 112 to exceed a threshold voltage (Vth) sufficient to cause the low-side switch device 112 to become conductive. Responsive thereto, the low-side switch device 112 may be conductive for an amount of time proportional to an amount of time for which the low-side gate control signal is asserted.

Similarly, the controller 202 provides high-side control signals to the high-side driver circuit 204 to cause the high-side driver circuit 204 to provide high-side gate control signals to the high-side switch device 110. For example, the controller 202 provides first high-side control signals to cause the high-side driver circuit 204 to provide a first high-side gate control signal to the high-side switch device 110, such as to the transistor 118, and provides second high-side control signals to cause the high-side driver circuit 204 to provide a second high-side gate control signal to the high-side switch device 110, such as to the transistor 116.

In some examples, the controller 202 provides control signals to the high-side driver circuit 204 to cause the high-side driver circuit 204 to control the transistor 118 to perform an action (e.g., become conductive, enter a low-conductivity state, become substantially non-conductive in a forward direction, etc.) prior to controlling the transistor 116 to perform the action. In some examples, the controller 202 may provide the control signals to sequence control of the transistors 116, 118, such as to reduce a risk of Vds overstress of one or both of the transistors 116, 118. For example, at a first time, the controller 202 provides a high-side off control signal (HS_OFF) having a logic level low value to the to the high-side driver circuit 204. Responsive to HS_OFF having the logic level low value, the high-side driver circuit 204 controls the transistors 116, 118 to be conductive in a forward direction such that approximately all current flowing through the transistors 116, 118 flows through their respective channels. At a second time, the controller 202 provides HS_OFF having a logic level high value to the to the high-side driver circuit 204. The controller 202 also provides a second (C2) and third (C3) control signals having logic level high values to the high-side driver circuit 204. Responsive to the second and third control signals having the logic level high value, the high-side driver circuit 204 controls the transistors 116, 118 to be in the low-conductivity state, as described above herein, in which a majority of current flows through the channels of the transistors 116, 118 and a minority of current flows through a body diode of the transistors 116, 118. In some examples, the transistor 118 is controlled based on the second control signal and the transistor 116 is controlled based on the third control signal. In such an example, the third control signal may be delayed from the second control signal. For example, responsive to providing the second control signal having the logic level high value, the controller 202 may detect, sense, monitor, or otherwise receive an indication of a voltage of a gate voltage of the transistor 118. Responsive to the gate voltage of the transistor 118 decreasing to be less than a threshold value, the controller 202 provides the third control signal having the logic level high value. In this way, the controller 202 causes the gate terminals of the transistors 116, 118 to be biased, increasing a gate-to-drain voltage (Vgd) of the transistors 116, 118, respectively. In some examples, the increased Vgd of each respective transistor 116, 118 is greater than Vth of the respective transistor 116, 118, causing the transistor 116, 118 to remain conductive in a forward direction. However, the biasing of the gate voltages of the transistors 116, 118 may result in a Vgs of each respective transistor 116, 118 that is not greater than Vth of the respective transistor 116, 118 but also large enough to cause a majority of current to flow through a channel of the transistors 116, 118 rather than the body diode of the transistors 116, 118, mitigating the flow of current in a reverse direction through channels of the transistors 116, 118 and preventing formation of a shoot-through current path through the high-side switch device 110.

Responsive to passage of a programmed amount of time after providing HS_OFF having the logic level high value, the controller 202 provides LSD_GT having a logic level high value. In some examples, responsive to providing the second control signal having the logic level high value, the controller 202 may detect, sense, monitor, or otherwise receive an indication of a voltage of a gate voltage of the transistor 118. Responsive to the gate voltage of the transistor 118 decreasing to be less than a second threshold value, the controller 202 provides the LSD_GT signal having the logic level high value. Responsive to LSD_GT having the logic level high value, a voltage provided at a switch node (SW) of the power converter 104 is pulled down by the low side switch device 112 to approximately equal a ground voltage potential and the transistors 116, 118 cease conduction in the forward direction responsive to SW being less than Vout. In some examples, responsive to passage of a programmed amount of time after providing LSD_GT having the logic level high value, the controller 202 provides the second and third control signals having a logic level low value. In some examples, responsive to the second and third control signals having the logic level low value, the transistors 116, 118 cease conduction in the forward direction. In other examples, the second and third control signals may remain having logic level high values, such as until HS_OFF is subsequently provided having a logic level low value. Responsive to passage of the programmed amount of time after providing LSD_GT having the logic level high value, the controller 202 provides fourth (C4) and fifth (C5) control signals to the high-side driver circuit 204. In some examples, responsive to LSD_GT having the logic level high value, the controller 202 may detect, sense, monitor or otherwise receive an indication of SW. Responsive to SW decreasing below a threshold value, the controller 202 may provide the fourth and fifth control signals each having a logic level high value. Responsive to the fourth and fifth control signals having the logic level high value, the high-side driver circuit 204 controls the transistors 116, 118 to have a Vgs of approximately 0 volts (V), such as by electrically coupling the gate and source terminals of the transistor 116, and the gate and source terminals of the transistor 118. In some examples, the transistor 118 is controlled based on the fourth control signal and the transistor 116 is controlled based on the fifth control signal.

Figure 3:
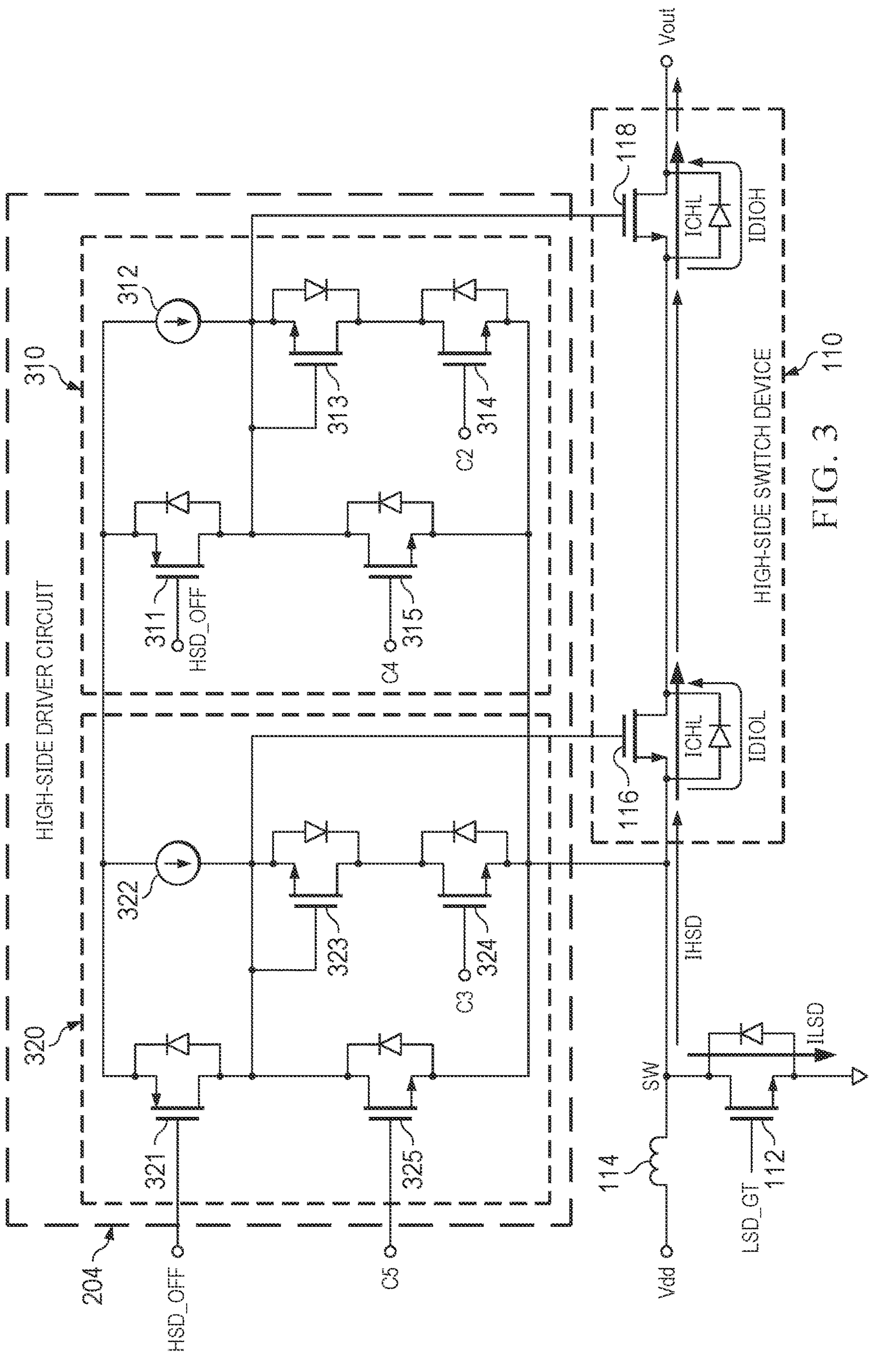
FIG. 3 is a schematic diagram of the high-side driver circuit, in accordance with various examples.

FIG. 3 is a schematic diagram of the high-side driver circuit 204, in accordance with various examples. While described in the context of the system 100 and control circuitry 106, in various examples the high-side driver circuit 204 may be suitable for implementation in other systems or devices to provide gate control signals to switching devices, the scope of which is not limited herein. In an example, the high-side driver circuit 204 includes a bias circuit 310 and a bias circuit 320. While the high-side driver circuit 204 as shown in FIG. 3 includes two bias circuits (e.g., 310, 320), in various other examples the high-side driver circuit 204 may include a number of bias circuits corresponding to a number of stacked transistors in a switch device. In an example, the bias circuit 310 includes a transistor 311, a current source 312, a transistor 313, a transistor 314, and a transistor 315, coupled as shown in FIG. 3. Similarly, in an example, the bias circuit 320 includes a transistor 331, a current source 332, a transistor 333, a transistor 324, and a transistor 325, also coupled as shown in FIG. 3. The transistors 311, 321 may each receive HSD_OFF at their gate terminals, the transistor 314 may receive the second control signal, the transistor 324 may receive the third control signal, the transistor 315 may receive the fourth control signal, and the transistor 325 may receive the fifth control signal, each as described above herein.

In an example of operation of the high-side driver circuit 204, at a first time, each of HSD_OFF and the second through fifth control signals may be received having logic level low values. Responsive to the control signals in this state, the transistors 311, 321 are conductive in a forward direction, and the transistors 314, 315, 324, 325 are non-conductive in the forward direction. At a second time, HSD_OFF is received having a logic level high value. Responsive to HSD_OFF transitioning from having the logic level low value to having a logic level high value, the transistors 311, 321 become non-conductive in the forward direction. Also responsive to HSD_OFF transitioning from having the logic level low value to having the logic level high value, the second control signal is received having a logic level high value. Responsive to the second control signal having the logic level high value, the transistor 314 becomes conductive in the forward direction, creating a conductive path from the current source 312, through a body diode of the transistor 313, a channel of the transistor 313, or both, and to a switch node of the power converter 104 (in examples in which the high-side driver circuit 204 is coupled to the power converter 104). The current source 312 provides a current signal through the conductive path that causes a voltage provided at the drain terminal of the transistor 313 to have a value approximately equal to SW plus a diode voltage of the body diode of the transistor 313. Vds of transistor 313 may be represented as Vint in this configuration.

Responsive to the gate voltage of the transistor 118 decreasing to be less than a threshold value, at a third time, the third control signal is received having a logic level high value. Responsive to the third control signal having the logic level high value, the transistor 324 becomes conductive in the forward direction, creating a conductive path from the current source 322, through a body diode of the transistor 323, a channel of the transistor 323, or both, and to the switch node of the power converter 104 (in examples in which the high-side driver circuit 204 is coupled to the power converter 104). The current source 322 provides a current signal through the conductive path that causes a voltage provided at the drain terminal of the transistor 323 to have a value approximately equal to a voltage provided at the source terminal of the transistor 116, plus a diode voltage of the body diode of the transistor 323. Vgs of the transistor 116 may also be represented as Vint in this configuration.

In an example, Vint has a value sufficiently large as to cause Vgd of the transistors 116, 118 to be greater than Vth of the transistors 116, 118, but also sufficiently small as to cause Vgs of the transistors 116, 118 to be less than Vth of the transistors 116, 118. In this way, the biasing of the gate voltages of the transistors 116, 118 at Vint may maintain the transistors 116, 118 in a forward conductive state, while also mitigating the flow of current in a reverse direction through channels of the transistors 116, 118 to prevent formation of a shoot-through current path through the high-side switch device 110.

At a fourth time, the fourth and fifth control signal are received having a logic level high value. In some examples, the controller 202 provides the fourth and fifth control signals responsive to assertion of a switch node low (SW_LOW) signal. In an example, SW_LOW is provided having a logic level high value responsive to determining that SW has decreased to be less than or equal to a threshold value, such as resulting from forward conduction of the low side switch device 112 responsive to LSD_GT transitioning to have a logic level high value. SW_LOW may have a logic level low value otherwise. The threshold value for determining SW_LOW may be any suitable value, the scope of which is not limited herein. Responsive to the fourth control signal having the logic level high value, the transistor 315 becomes conductive in the forward direction, creating a conductive path from the gate terminal of the transistor 118 to SW. This conductive path causes the transistor 118 to have a gate voltage (Vg) approximately equal to SW, causing the transistor 118 to become non-conductive in the forward direction. Responsive to the fifth control signal having the logic level high value, the transistor 325 becomes conductive in the forward direction, creating a conductive path from the gate terminal of the transistor 116 to the source terminal of the transistor 116. This conductive path causes the transistor 116 to have a Vgs of approximately 0 V, causing the transistor 116 to become non-conductive in the forward direction. In an example, the control signals may remain in the state provided at the fifth time until such time as HSD_OFF is again received having a logic level low value, at which time the second through fifth control signals may also transition to having logic level low values and the high-side driver circuit 204 operate as described above with respect to the first time.

Figure 4:
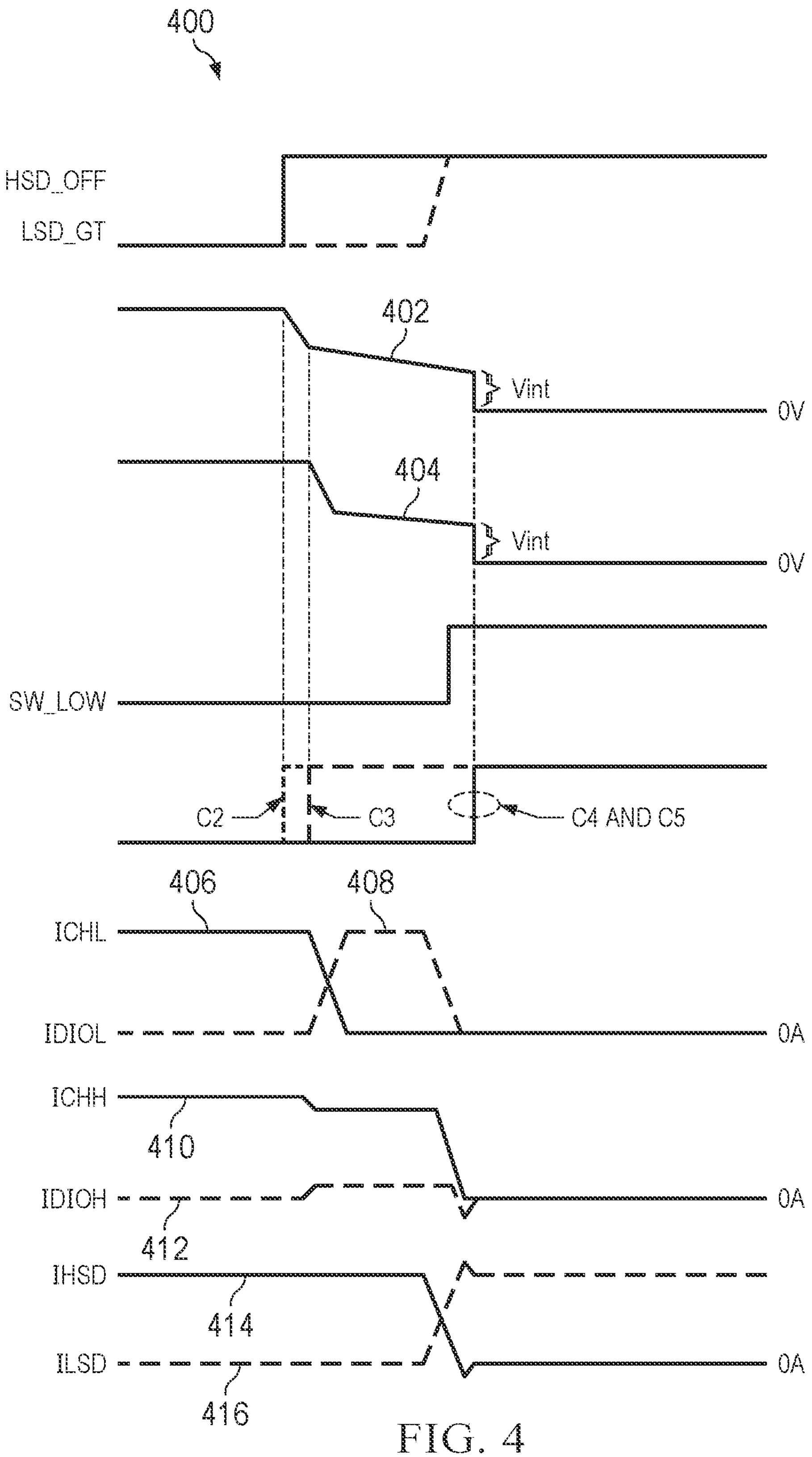
FIG. 4 is a diagram of signal waveforms, in accordance with various examples.

FIG. 4 is a diagram 400 of signal waveforms, in accordance with various examples. In an example, the signal waveforms of the diagram 400 are representative of at least some signals which may be provided in the system 100. For example, the diagram 400 includes HSD_OFF, LSD_GT, and SW_LOW, each as described above, a signal 402 representative of Vg of the transistor 118 minus SW, a signal 404 representative of a Vgs of the transistor 116, a signal 406 representative of a current flow through a channel of the transistor 116, a signal 408 representative of a current flow through a body diode of the transistor 116, a signal 410 representative of a current flow through a channel of the transistor 118, a signal 412 representative of a current flow through body diode of the transistor 118, a signal 414 representative of a current flow through the high-side switch device 110, and a signal 416 representative of a current flow through the low-side switch device 112. The diagram 400 also includes control signals C2, C3, C4, and C5, as described above herein. In an example, the diagram 400 is representative of the system 100 in an operating environment in which a body diode of the transistor 116 may conduct a greater amount of current than a channel of the transistor 116, and a channel of the transistor 118 may conduct a greater amount of current than a body diode of the transistor 118.

As shown by the diagram 400, responsive to HSD_OFF transitioning from a logic level low value to a logic level high value, the signals 402 and 404 decrease in value to approximately Vint, provided by the high-side driver circuit 204, as described above. As further shown by comparing the signal 404 to the signal 402, control of the transistor 116 is delayed from control of the transistor 118. Responsive to the decrease in value of the signals 402, 404, an amount of current flowing through the respective channels of the transistors 116, 118 decreases, as shown by the signals 406, 410. Correspondingly, an amount of current flowing through the respective body diodes of the transistors 116, 118 increases, as shown by the signals 408, 412. Responsive to LSD_GT transitioning from a logic level low value to a logic level high value, current through the low-side switch device 112 increases, as shown by the signal 416. Responsive to a sufficient amount of current flowing through the low-side switch device 112 to cause a value of SW to decrease to less than a threshold amount, SW_LOW transitions from a logic level low value to a logic level high value. Responsive to the transition of SW_LOW to the logic level high value, the transistors 116, 118 are controlled according to fifth and fourth control signals, respectively, to turn off, ceasing forward conduction and current flow through the transistors 116, 118, as described above herein and shown by the signals 402-412. As further shown by the signals 402-412, by controlling the transistors 116, 118 to cause a majority of current to flow through the channel of the transistor 118 rather than the body diode of the transistor 118, reverse recovery currents of the transistor 118 (and therefore combination of transistors 116, 118 forming the high-side switch device 110) is decreased, mitigating voltage instability and/or damage to components of the system 100, as described above herein.

Figure 5:
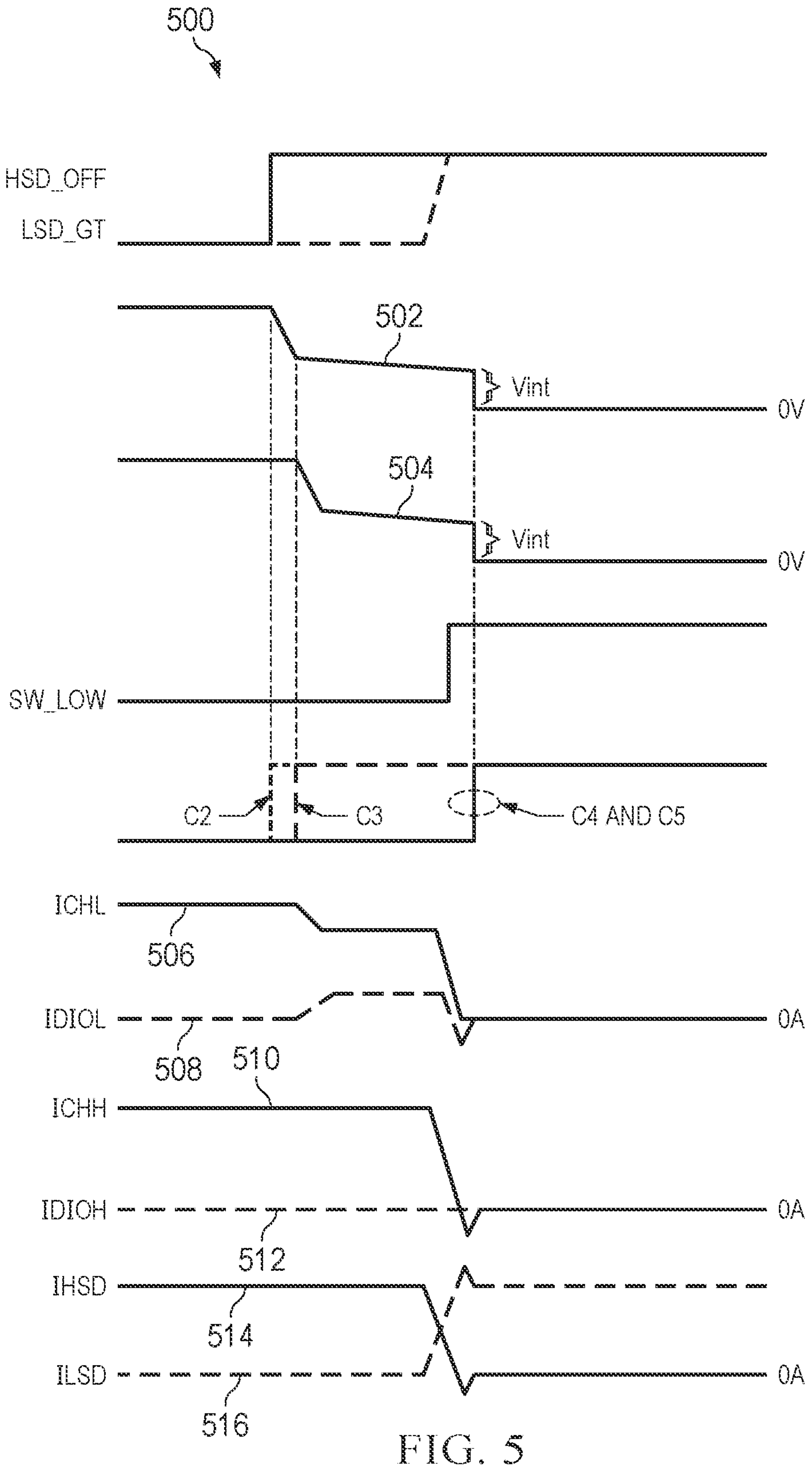
FIG. 5 is a diagram of signal waveforms, in accordance with various examples.

FIG. 5 is a diagram 500 of signal waveforms, in accordance with various examples. In an example, the signal waveforms of the diagram 500 are representative of at least some signals which may be provided in the system 100. For example, the diagram 500 includes HSD_OFF, LSD_GT, and SW_LOW, each as described above, a signal 502 representative of a Vg of the transistor 118 minus SW, a signal 504 representative of a Vgs of the transistor 116, a signal 506 representative of a current flow through a channel of the transistor 116, a signal 508 representative of a current flow through a body diode of the transistor 116, a signal 510 representative of a current flow through a channel of the transistor 118, a signal 512 representative of a current flow through body diode of the transistor 118, a signal 514 representative of a current flow through the high-side switch device 110, and a signal 516 representative of a current flow through the low-side switch device 112. The diagram 500 also includes control signals C2, C3, C4, and C5, as described above herein. In an example, the diagram 500 is representative of the system 100 in an operating environment in which a majority of current flowing through the transistors 116, 118 flows through the channels of the respective transistors 116, 118, with a minority of current flowing through respective body diodes of the transistors 116, 118.

As shown by the diagram 500, responsive to HSD_OFF transitioning from a logic level low value to a logic level high value, the signals 502 and 504 decrease in value to approximately Vint, provided by the high-side driver circuit 204, as described above. As further shown by comparing the signal 504 to the signal 502, control of the transistor 116 is delayed from control of the transistor 118. Responsive to the decrease in value of the signals 502, 504, an amount of current flowing through the respective channels of the transistors 116, 118 decreases slightly, as shown by the signals 506, 510. Correspondingly, an amount of current flowing through the body diode of the transistor 116 increases slightly, while an amount of current flowing through the body diode of the transistor 118 remains approximately zero, as shown by the signals 508, 512. Responsive to LSD_GT transitioning from a logic level low value to a logic level high value, current through the low-side switch device 112 increases, as shown by the signal 516. Responsive to a sufficient amount of current flowing through the low-side switch device 112 to cause a value of SW to decrease to less than a threshold amount, SW_LOW transitions from a logic level low value to a logic level high value. Responsive to the transition of SW_LOW to the logic level high value, the transistors 116, 118 are controlled according to fifth and fourth control signals, respectively, to turn off, ceasing forward conduction and current flow through the transistors 116, 118, as described above herein and shown by the signals 502-512. As further shown by the signals 502-512, by controlling the transistors 116, 118 to cause a majority of current to flow through the channels of the transistors 116, 118 rather than the body diodes of the transistors 116, 118, reverse recovery currents of the transistors 116, 118 are decreased, mitigating voltage instability and/or damage to components of the system 100, as described above herein.

Figure 6A:
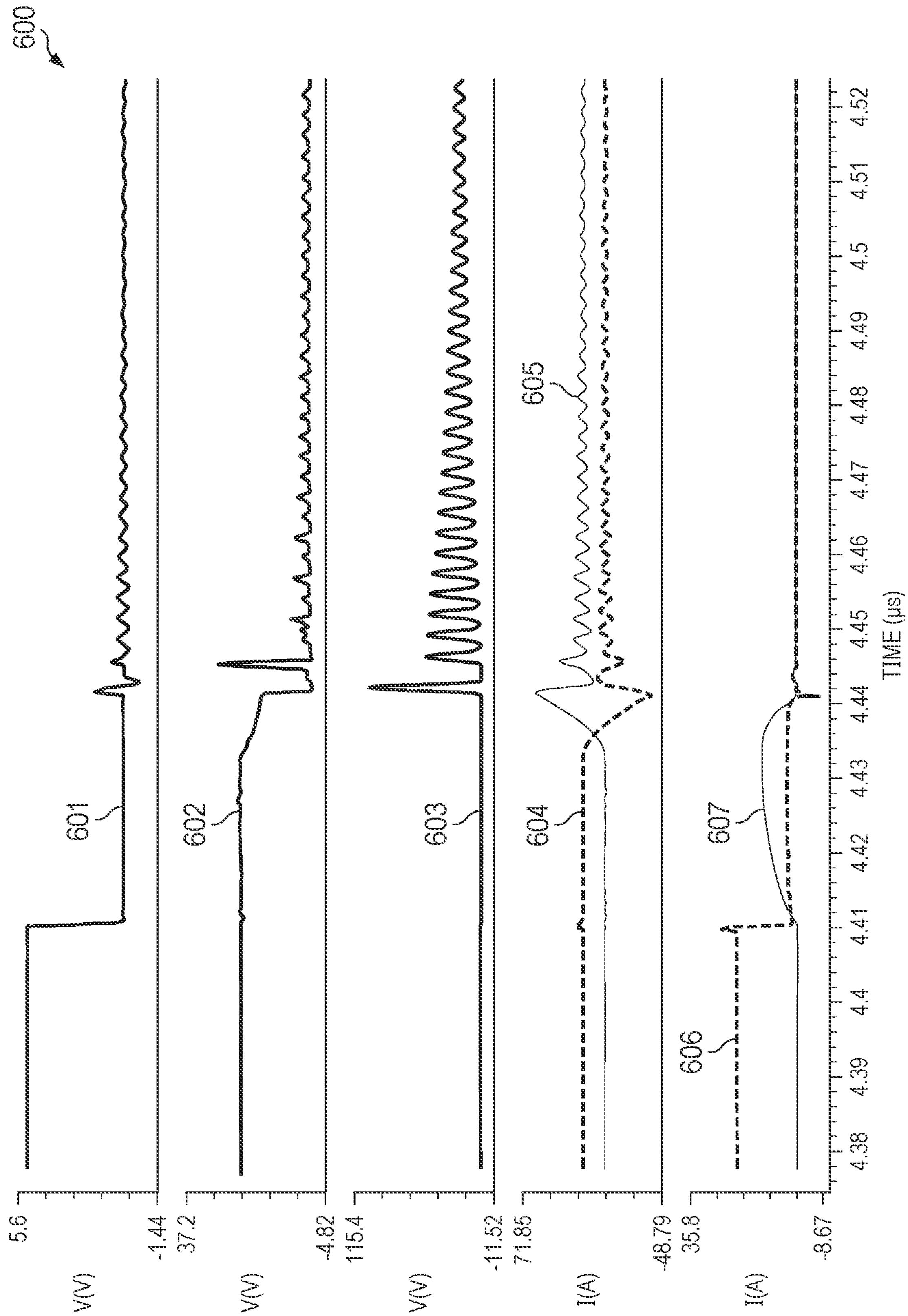
FIGS. 6A and 6B are diagrams of signal waveforms, in accordance with various examples.
Figure 6B:
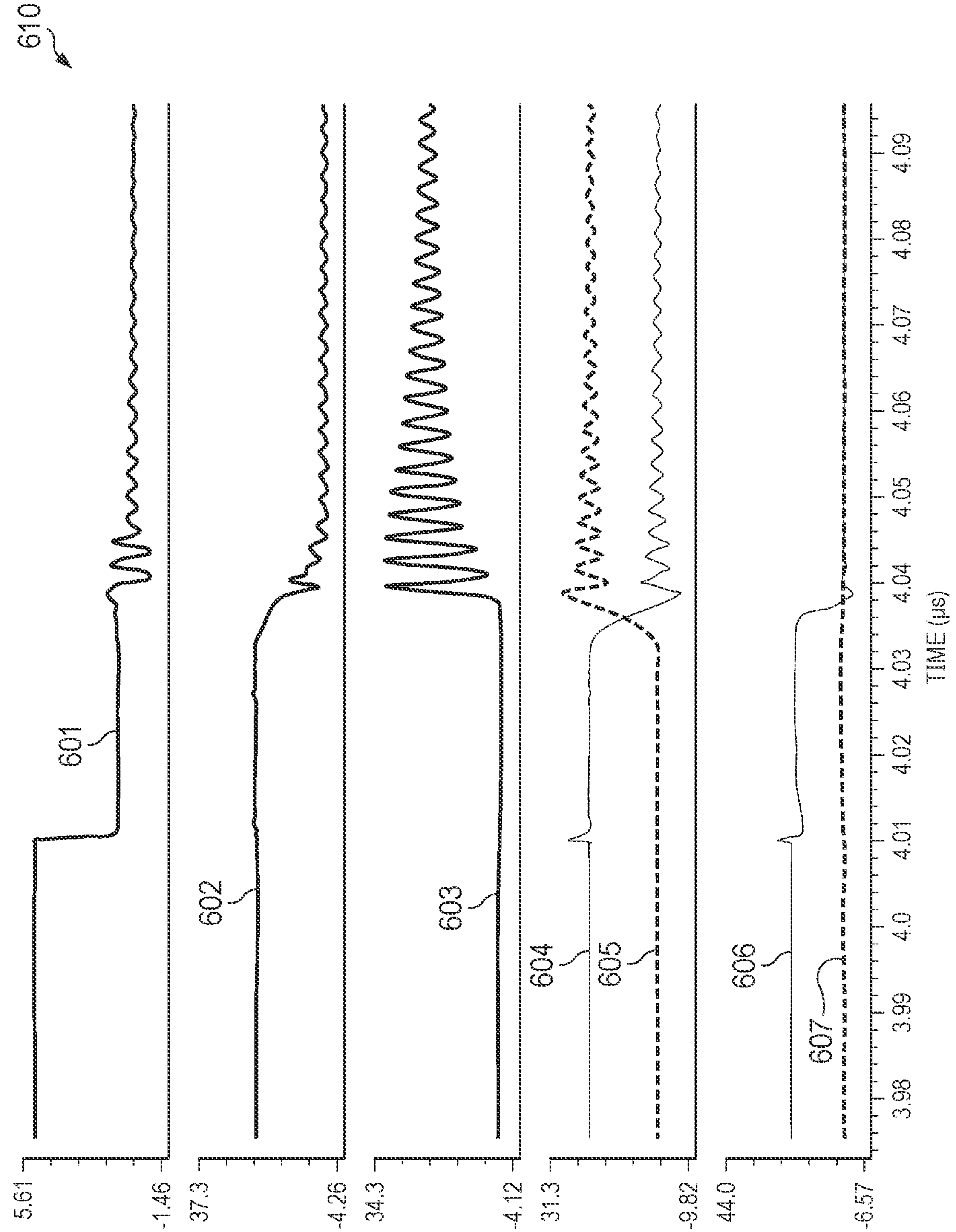

FIGS. 6A and 6B are diagrams 600, 610, respectively, of signal waveforms, in accordance with various examples. In an example, the signal waveforms of the diagram 600 are representative of waveforms in a system, such as the system 100, which lacks the transistor 116 and lacks reverse recovery current reduction, as described herein. In an example, the signal waveforms of the diagram 610 are representative of waveforms in a system, such as the system 100, which lacks the transistor 116 but includes the reverse recovery current reduction, as described herein.

The diagram 600 includes signals 601 representative of a Vgs of the transistor 118, signal 602 representative of a voltage provided at a switch node of the power converter 104 (e.g., at the source terminal of the transistor 118), a signal 603 representative of a Vds of the transistor 118, a signal 604 representative of a current flowing through the transistor 118, a signal 605 representative of a current flowing through the low-side switch device 112, a signal 606 representative of current flowing through a channel of the transistor 118 (as contrasted to the signal 604 which includes current flowing through both the channel and the body diode of the transistor 118), and a signal 607, representative of a current flowing through a body diode of the transistor 118. In an example, the signals 601, 602, 603 are shown having a horizontal axis representative of time in units of microseconds (ρs) and a vertical axis representative of voltage in units of V. In an example, the signals 604, 605, 606, 607 are shown having a horizontal axis representative of time in units of ρs and a vertical axis representative of current in units of amperes (A).

As shown by the diagram 600, responsive to the signal 601 decreasing in value to approximately 0 V, current flowing through a channel of the transistor 118 also decreases, as shown by the signal 606, with current continuing to flow through the transistor 118 via its body diode, as shown by the signal 604 and signal 607. Responsive to the low-side switch device 112 becoming conductive and current beginning to flow through the low-side switch device 112, as shown by the signal 605, a reverse, or negative, current flows through the transistor 118, as shown by the signal 604. This reverse current may be a result of reverse recovery characteristics of the body diode of the transistor 118. Resulting from parasitic inductances of the power converter 104, as described above herein, the reverse current flowing through the transistor 118 may cause a spike to occur in a value of the signal 602, as well as increase a value of the signal 603. In some examples, this may cause the signal 603 to exceed a safe operating range of the transistor 118, resulting in damage to the transistor 118 or any other component(s) of the system 100.

The diagram 610 includes the same signals as the diagram 600, but in an operational environment which includes the reverse recovery current reduction, as described above herein. As shown by the diagram 610, responsive to the signal 601 decreasing in value to an intermediate value (e.g., Vint), current flowing through the channel of the transistor 118 also decreases, as shown by the signal 606, but the transistor 118 continues conducting in a forward direction with a majority of current flowing through the transistor 118 continuing to flow through the transistor 118 via its channel and a minority of current flowing through the transistor 118 flowing through its body diode, as shown by comparing the signal 606 to the signal 604. Responsive to the low-side switch device 112 becoming conductive and current beginning to flow through the low-side switch device 112, as shown by the signal 605, a reverse, or negative, current flows through the transistor 118, as shown by the signal 604. This reverse current may be a result of reverse recovery characteristics of the body diode of the transistor 118. Resulting from parasitic inductances of the power converter 104, as described above herein, the reverse current flowing through the transistor 118 may cause a spike to occur in a value of the signal 602, as well as increase a value of the signal 603. However, as shown by comparing the diagram 610 to the diagram 600, because only a minority of the current flowing through the transistor 118 flows through the body diode of the transistor 118, a value of the reverse current flowing through the transistor 118 decreases. The decreased reverse current flowing through the transistor 118 results in a reduced spike in the value of the signal 602, as well as increase in value of the signal 603. However, despite the increase in the value of the signal 603, the signal 603 may remain within the safe operating range of the transistor 118, mitigating, due to the reduction in the reverse recovery current, damage to the transistor 118 or other component(s) of the system 100.

Figure 7A:
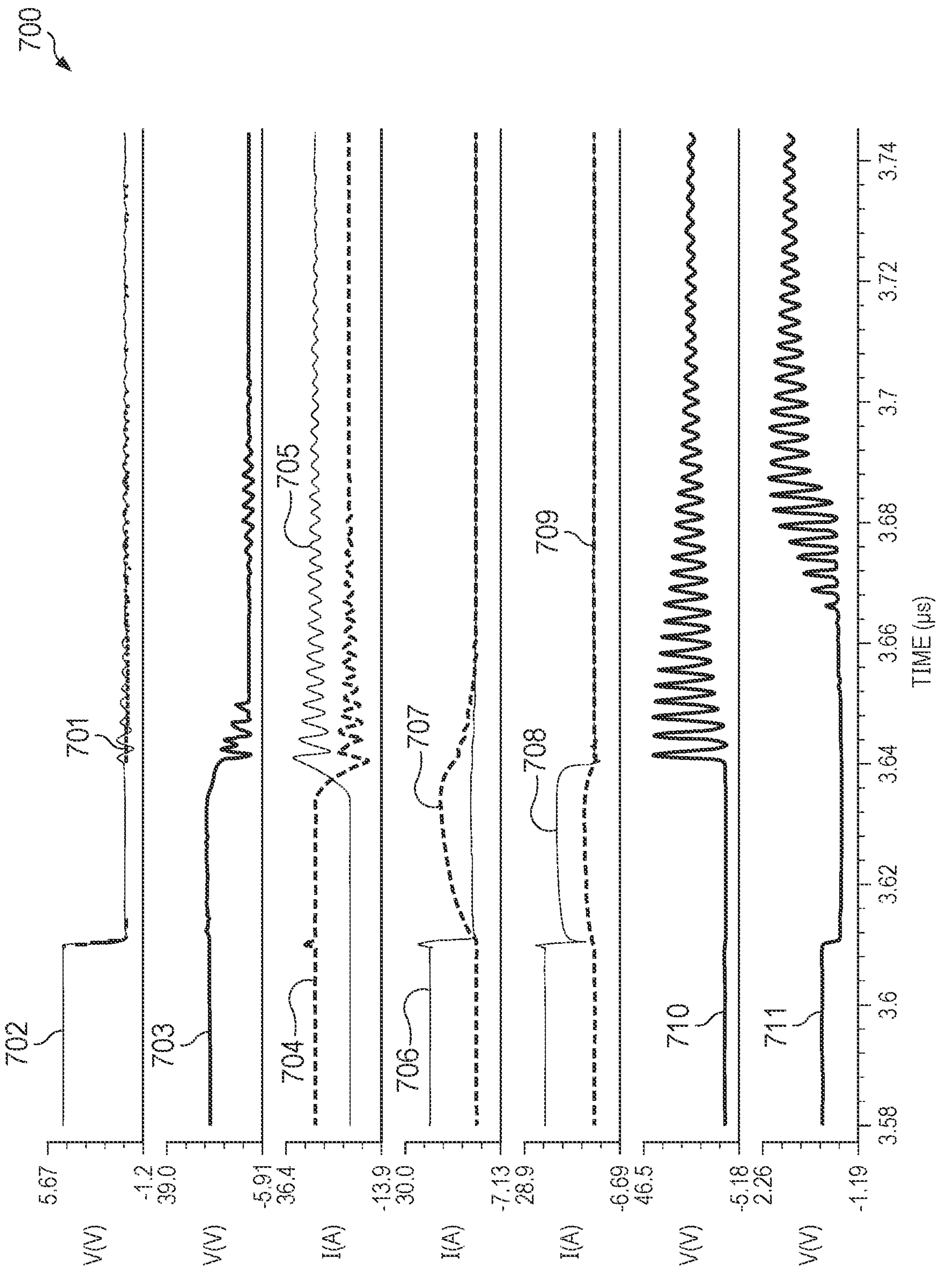
FIGS. 7A and 7B are diagrams of signal waveforms, in accordance with various examples.
Figure 7B:
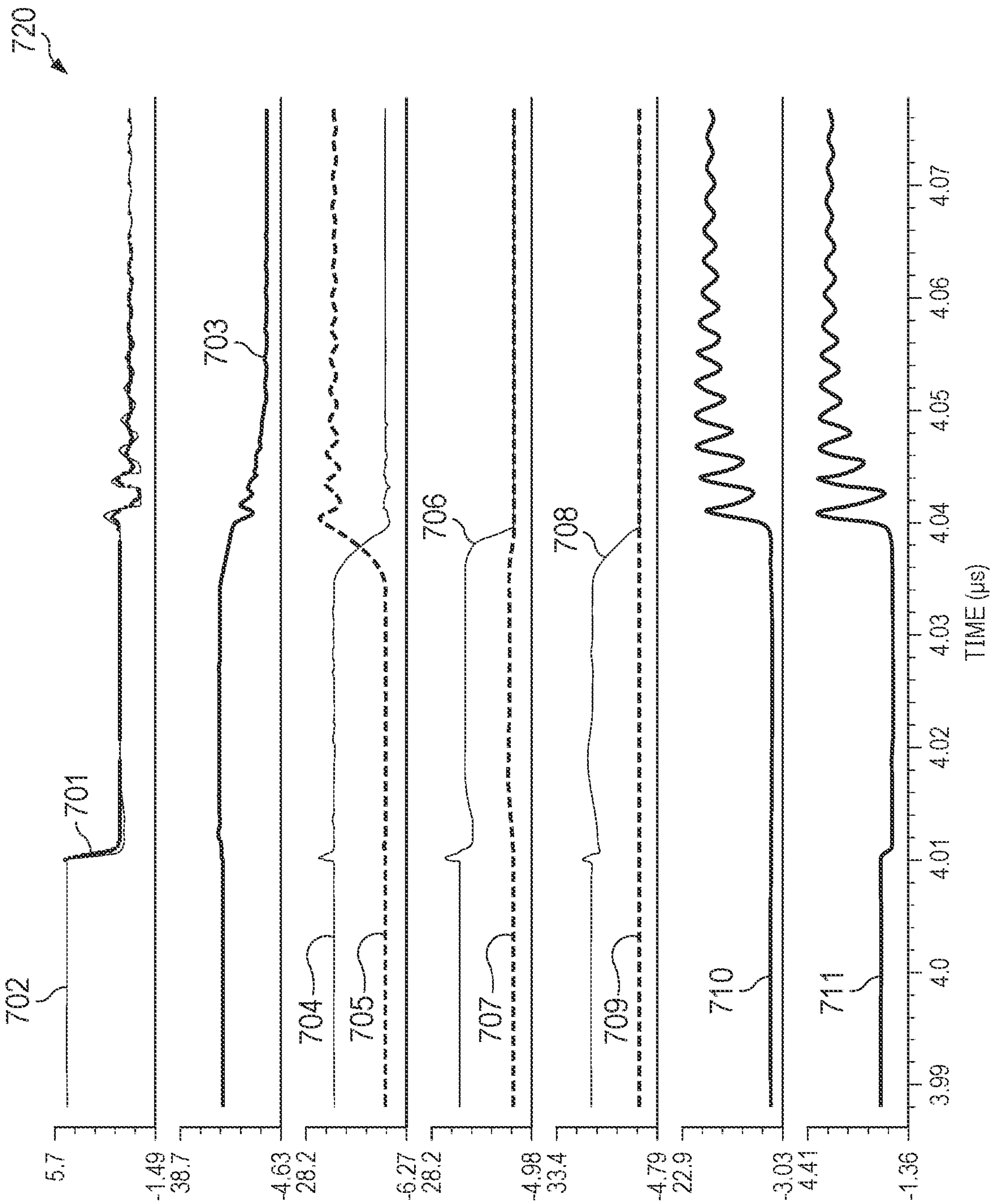

FIGS. 7A and 7B are diagram 700, 720 of signal waveforms, in accordance with various examples. In an example, the signal waveforms of the diagram 700 are representative of waveforms in a system, such as the system 100, which lacks reverse recovery current reduction, as described herein. In an example, the signal waveforms of the diagram 720 are representative of waveforms in a system, such as the system 100, which includes the reverse recovery current reduction, as described herein.

The diagram 700 includes signals 701 representative of a Vgs of the transistor 116, signal 702 representative of a Vg of the transistor 118 minus SW, a signal 703 representative of a voltage provided at a switch node of the power converter 104 (e.g., at the source terminal of the transistor 116), a signal 704 representative of a current flowing through the high-side switch device 110, a signal 705 representative of a current flowing through the low-side switch device 112, a signal 706 representative of a current flowing through the channel of the transistor 116, a signal 707 representative of a current flowing through a body diode of the transistor 116, a signal 708 representative of a current flowing through the channel of the transistor 118, a signal 709 representative of a current flowing through a body diode of the transistor 118, a signal 710 representative of a Vds of the transistor 118, and a signal 711 representative of a Vds of the transistor 116. In an example, the signals 701, 702, 703, 704, 710, and 711 are shown having a horizontal axis representative of time in units of ρs and a vertical axis representative of voltage in units of V. In an example, the signals 704, 705, 706, 707, 708, 709 are shown having a horizontal axis representative of time in units of ρs and a vertical axis representative of current in units of A.

As shown by the diagram 700, responsive to the signals 701, 702 decreasing in value to approximately 0 V, current flowing through a channel of the transistors 116, 118 also decreases, as shown by the signals 706, 708, respectively, with current continuing to flow through the transistors 116, 118 via their body diodes, as shown by the signal 704. Responsive to the low-side switch device 112 becoming conductive and current beginning to flow through the low-side switch device 112, as shown by the signal 705, a reverse, or negative, current flows through the transistors 116, 118, as shown by the signal 704. This reverse current may be a result of reverse recovery characteristics of the body diodes of the transistors 116, 118. Resulting from parasitic inductances of the power converter 104, as described above herein, the reverse current flowing through the transistors 116, 118 may cause a spike to occur in a value of the signal 703, as well as increase a value of the signal 710. In some examples, this may cause the signal 710 to exceed a safe operating range of the transistor 118, resulting in damage to the transistor 118 or any other component(s) of the system 100.

The diagram 720 includes the same signals as the diagram 700, but in an operational environment which includes the reverse recovery current reduction, as described above herein. As shown by the diagram 720, responsive to the signals 701, 702 decreasing in value to an intermediate value (e.g., Vint), current flowing through the channels of the transistors 116, 118 also decreases, as shown by the signals 706, 708, but the transistors 116, 118 continue conducting in a forward direction with a majority of current flowing through the transistors 116, 118 continuing to flow through the transistors 116, 118 via their channels and a minority of current flowing through the transistors 116, 118 flowing through their respective body diodes, as shown by comparing the signals 706, 708 to the signal 704. Responsive to the low-side switch device 112 becoming conductive and current beginning to flow through the low-side switch device 112, as shown by the signal 705, a reverse, or negative, current flows through the transistors 116, 118, as shown by the signal 704, 706, 708. This reverse current may be a result of reverse recovery characteristics of the body diode of the transistors 116, 118. Resulting from parasitic inductances of the power converter 104, as described above herein, the reverse current flowing through the transistors 116, 118 may cause a spike to occur in a value of the signal 703, as well as increase a value of the signal 710. However, as shown by comparing the diagram 720 to the diagram 700, because only a minority of the current flowing through the transistors 116, 118 flows through the respective body diodes of the transistors 116, 118, a value of the reverse current flowing through the transistors 116, 118 decreases. The decreased reverse current flowing through the transistors 116, 118 results in a reduced spike in the value of the signal 703, as well as increase in value of the signal 710. However, despite the increase in the value of the signal 710, the signal 710 may remain within the safe operating range of the transistor 118, mitigating, due to the reduction in the reverse recovery current, damage to the transistor 118 or other component(s) of the system 100.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or a semiconductor component. Furthermore, a voltage rail or more simply a "rail," may also be referred to as a voltage terminal and may generally mean a common node or set of coupled nodes in a circuit at the same potential.

What is claimed is:

1. A circuit, comprising:

a gate driver having a reference terminal and an output terminal and including:

a first transistor having first and second terminals;

a first current source having first and second terminals, the first terminal of the first current source coupled to the first terminal of the first transistor, and the second terminal of the first current source coupled to the second terminal of the first transistor;

a second transistor having a control terminal and first and second terminals, the control terminal and the first terminal of the second transistor coupled together and coupled to the output terminal of the gate driver and to the second terminal of the first current source;

a third transistor having first and second terminals, the first terminal of the third transistor coupled to the second terminal of the second transistor; and a fourth transistor having first and second terminals, the first terminal of the fourth transistor coupled to the second terminal of the first current source, and the second terminal of the fourth transistor coupled to the second terminal of the third transistor and to the reference terminal of the gate driver.

2. The circuit of claim 1, further comprising a voltage source coupled to the first terminal of the first current source.

3. The circuit of claim 1, further comprising a power converter having a first high-side transistor coupled to a switch node, wherein the switch node is coupled to the reference terminal of the gate driver, and wherein the output terminal of the gate driver is coupled to a control terminal of the first high-side transistor.

4. The circuit of claim 1, wherein the output terminal of the gate driver is a first output terminal, and the gate driver has a second output terminal and further includes:

a fifth transistor having first and second terminals, the first terminal of the fifth transistor coupled to the first terminal of the first current source;

a second current source having first and second terminals, the first terminal of the second current source coupled to the first terminal of the fifth transistor, and the second terminal of the second current source coupled to the second terminal of the fifth transistor;

a sixth transistor having a control terminal and first and second terminals, the control terminal and the first terminal of the sixth transistor coupled together and coupled to the second output terminal of the gate driver and to the second terminal of the second current source;

a seventh transistor having first and second terminals, the first terminal of the seventh transistor coupled to the second terminal of the sixth transistor; and an eighth transistor having first and second terminals, the first terminal of the eighth transistor coupled to the second terminal of the second current source, and the second terminal of the eighth transistor coupled to the second terminal of the seventh transistor and to the reference terminal of the gate driver.

5. The circuit of claim 4, further comprising a power converter having a first high-side transistor coupled to a switch node and a second high-side transistor coupled in a stacked arrangement to the first high-side transistor, wherein:

the reference terminal of the gate driver is coupled to the switch node;

the first output terminal of the gate driver is coupled to a control terminal of the first high-side transistor; and the second output terminal of the gate driver is coupled to a control terminal of the second high-side transistor.

6. The circuit of claim 4, wherein the first, third, fourth, fifth, seventh, and eighth transistors each have a respective control terminal, the circuit further comprising a controller having respective output terminals coupled to the control terminals of the first, third, fourth, fifth, seventh, and eighth transistors.

7. The circuit of claim 1, wherein the first transistor has a control terminal, the third transistor has a control terminal, and the fourth transistor has a control terminal, the circuit further comprising a controller having respective output terminals coupled to the control terminals of the first transistor, third transistor, and fourth transistor.

8. The circuit of claim 1, wherein the third transistor is configurable to conduct a current provided by the first current source.

9. The circuit of claim 1, wherein the second transistor is configured to provide a diode voltage drop across the first and second terminals of the second transistor.

10. A circuit, comprising:

a power converter comprising first and second high-side transistors arranged to form a high-side switch device coupled between a switch node and an output terminal of the power converter;

a controller configured to provide first, second, and third control signals; and a high-side driver circuit coupled to the controller, the high-side driver circuit configured to:

provide gate control signals having first voltages based on the first control signal having a first value to cause the first and second high-side transistors to be conductive in a forward direction at a first time at a first conductive state;

provide gate control signals having second voltages based on the first control signal having a second value and second and third control signals to have the second value; and responsive to the second and third control signals, provide, by the high-side driver circuit, the gate control signals having second voltages at the gate terminals of the first and second high-side transistors to cause the first and second high-side transistors to be conductive in the forward direction at a second time at a second conductive state, wherein the second conductive state is less conductive than the first conductive state.

11. The circuit of claim 10, wherein the control circuitry is configured to:

provide, by the controller, fourth and fifth control signals having the second value; and responsive to the fourth and fifth control signals, provide, by the high-side driver circuit, the gate control signals having third voltages at the gate terminals of the first and second high-side transistors to cause the first and second high-side transistors to be non-conductive in the forward direction at a third time.

12. The circuit of claim 11, wherein the control circuitry is configured to:

provide the fourth and fifth control signals responsive to assertion of a switch node low signal.

13. The circuit of claim 12, wherein the power converter includes a low-side transistor coupled between the switch node and a ground terminal.

14. The circuit of claim 13, wherein the control circuitry is configured to assert the switch node low signal responsive to determining that forward conduction of the low-side transistor has caused a value of a voltage provided at the switch node to decrease to be less than a threshold amount.

15. The circuit of claim 11, wherein the high-side driver circuit includes:

a first transistor having first and second terminals;

a first current source having first and second terminals, the first terminal of the first current source coupled to the first terminal of the first transistor, and the second terminal of the first current source coupled to the second terminal of the first transistor;

a second transistor having a control terminal and first and second terminals, the control terminal of the second transistor coupled to the second terminal of the first current source, and the first terminal of the second transistor coupled to the second terminal of the first current source;

a third transistor having first and second terminals, the first terminal of the third transistor coupled to the second terminal of the second transistor; and a fourth transistor having first and second terminals, the first terminal of the fourth transistor coupled to the second terminal of the first current source, and the second terminal of the fourth transistor coupled to the second terminal of the third transistor.

16. The circuit of claim 15, wherein the control circuitry is configured to:

control the first transistor based on the first control signal;

control the third transistor based on the second control signal; and control the fourth transistor based on the fourth control signal.

17. The circuit of claim 16, wherein the first transistor is conductive in a forward direction responsive to the first control signal having the first value and is non-conductive in the forward direction responsive to the first control signal having the second value.

18. The circuit of claim 16, wherein the third transistor is conductive in a forward direction responsive to the second control signal having the second value, and wherein the fourth transistor is conductive in the forward direction responsive to the fourth control signal having the second value.

19. The circuit of claim 15, wherein the high-side driver circuit includes:

a fifth transistor having first and second terminals, the first terminal of the fifth transistor coupled to the first terminal of the first current source;

a second current source having first and second terminals, the first terminal of the second current source coupled to the first terminal of the fifth transistor, and the second terminal of the second current source coupled to the second terminal of the fifth transistor;

a sixth transistor having a control terminal and first and second terminals, the control terminal of the sixth transistor coupled to the second terminal of the second current source, and the first terminal of the sixth transistor coupled to the second terminal of the second current source;

a seventh transistor having first and second terminals, the first terminal of the seventh transistor coupled to the second terminal of the sixth transistor; and an eighth transistor having first and second terminals, the first terminal of the eighth transistor coupled to the second terminal of the second current source, and the second terminal of the eighth transistor coupled to the second terminal of the seventh transistor and to the second terminal of the third transistor.

20. The circuit of claim 19, wherein the control circuitry is configured to:

control the fifth transistor based on the first control signal;

control the seventh transistor based on the third control signal; and control the eighth transistor based on the fifth control signal.

21. The circuit of claim 20, wherein the fifth transistor is conductive in a forward direction responsive to the first control signal having the first value and is non-conductive in the forward direction responsive to the first control signal having the second value, wherein the seventh transistor is conductive in a forward direction responsive to the third control signal having the second value, and wherein the eighth transistor is conductive in the forward direction responsive to the fifth control signal having the second value.

22. The circuit of claim 15, wherein the third transistor is configurable to conduct a current provided by the first current source.

23. The circuit of claim 15, wherein the second transistor is configured to provide a diode voltage drop across the first and second terminals of the second transistor.

24. The circuit of claim 10, wherein the control circuitry is configured to:

provide the third control signal having the second value responsive to determining that a gate voltage of the second high-side transistor has decreased to be less than a threshold amount, wherein the gate voltage of the second high-side transistor decreases responsive to the first control signal having the second value and the second control signal having the second value.

* * * * *